No. 664,171. Patented Dec. 18, 1900.
R. A. McLEOD
WINCH.
(Application filed July 10, 1900.)
(No Model.) 3 Sheets—Sheet 1.

Inventor
Robert A. McLeod.

Witnesses.

By
Attorneys.

THE NORRIS PETERS CO., PHOTO-LITHO., WASHINGTON, D. C.

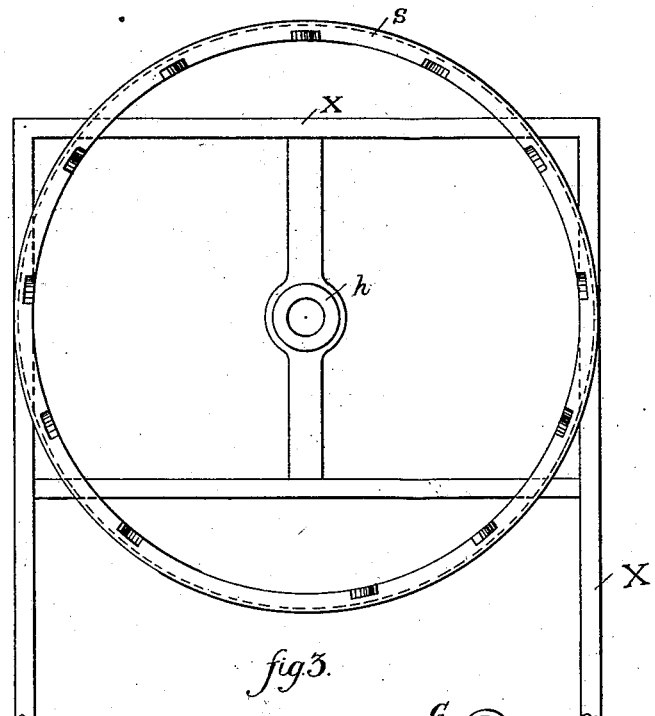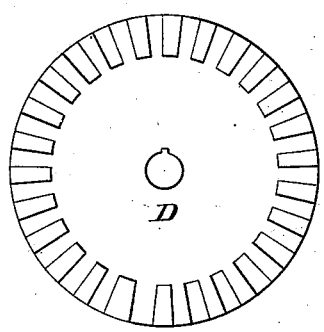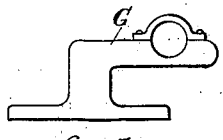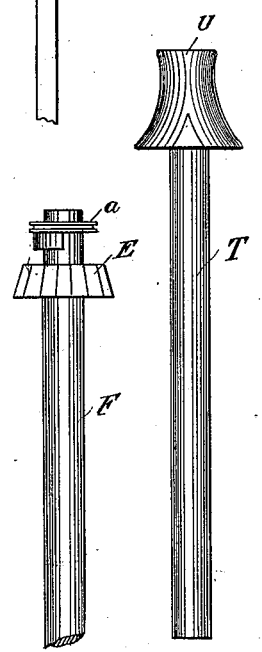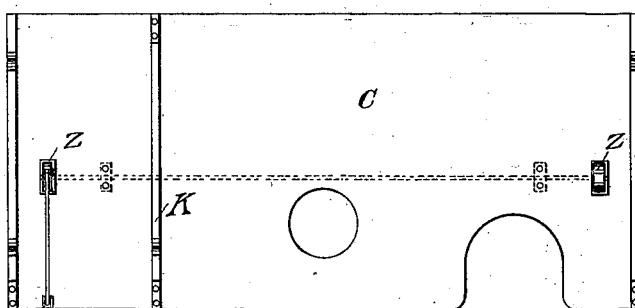

UNITED STATES PATENT OFFICE.

ROBERT ALEXANDER McLEOD, OF KAIHU, NEW ZEALAND.

WINCH.

SPECIFICATION forming part of Letters Patent No. 664,171, dated December 18, 1900.

Application filed July 10, 1900. Serial No. 23,106. (No model.)

*To all whom it may concern:*

Be it known that I, ROBERT ALEXANDER MCLEOD, contractor, a subject of Her Majesty the Queen of the United Kingdom of Great Britain and Ireland, residing at Kaihu, in the provincial district of Auckland and Colony of New Zealand, have invented a certain new and useful Winch, of which the following is a specification.

This improved winch is a direct fair-lead winch, and its purpose is by swinging it around at the required angle to haul, lift, or lower loads direct without the use of lead-blocks or such like.

The invention comprises a winch-barrel driven by vertical gear-wheels from a main horizontal gear-wheel and which is movable on a circular guideway bolted or otherwise set into a frame so that the winch can be turned through a portion of a circle.

It also comprises a pull-back drum operated by gearing, and a horizontal capstan or gipsy is provided. Also a vertical shaft carrying a capstan or gipsy on its upper end is secured to the main horizontal gear-wheel and is held in position by a framework. Clutches are provided, so that the vertical gear-wheels can be thrown out of gear, and suitable means is provided for holding the winch in its horizontal adjustment.

Figure 1:
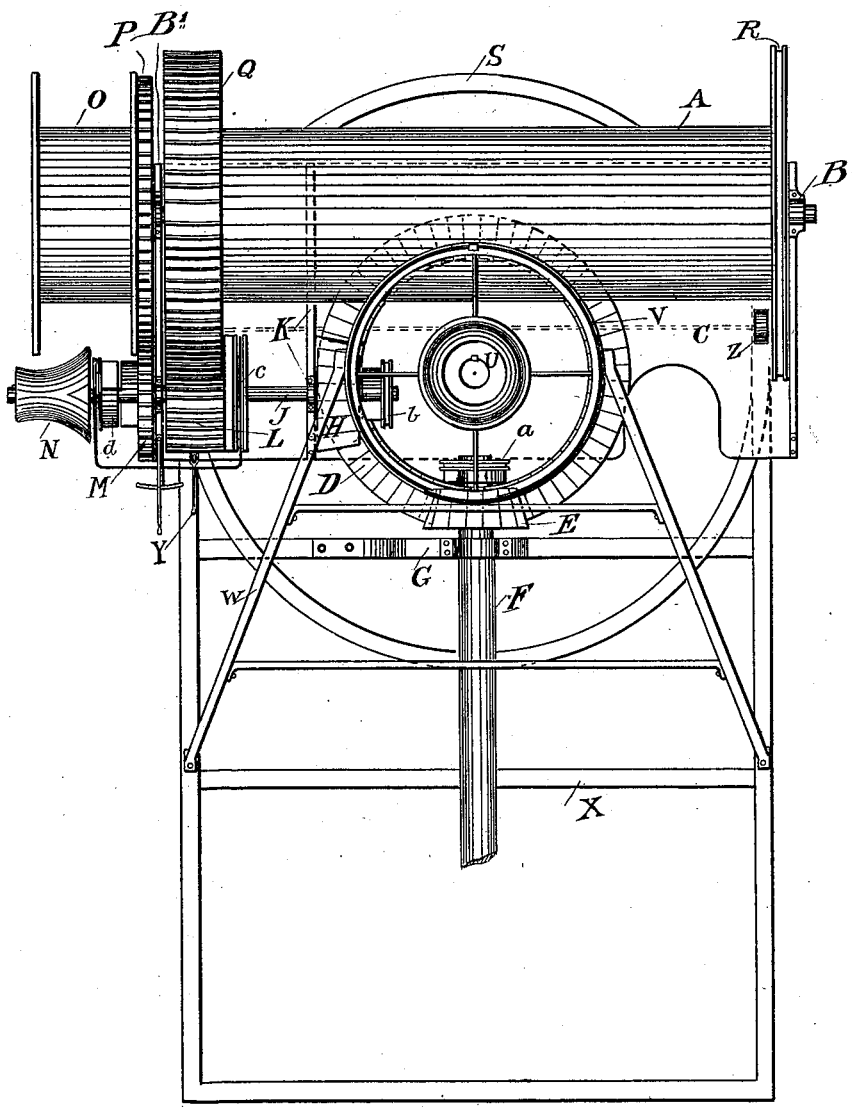
Figure 2:
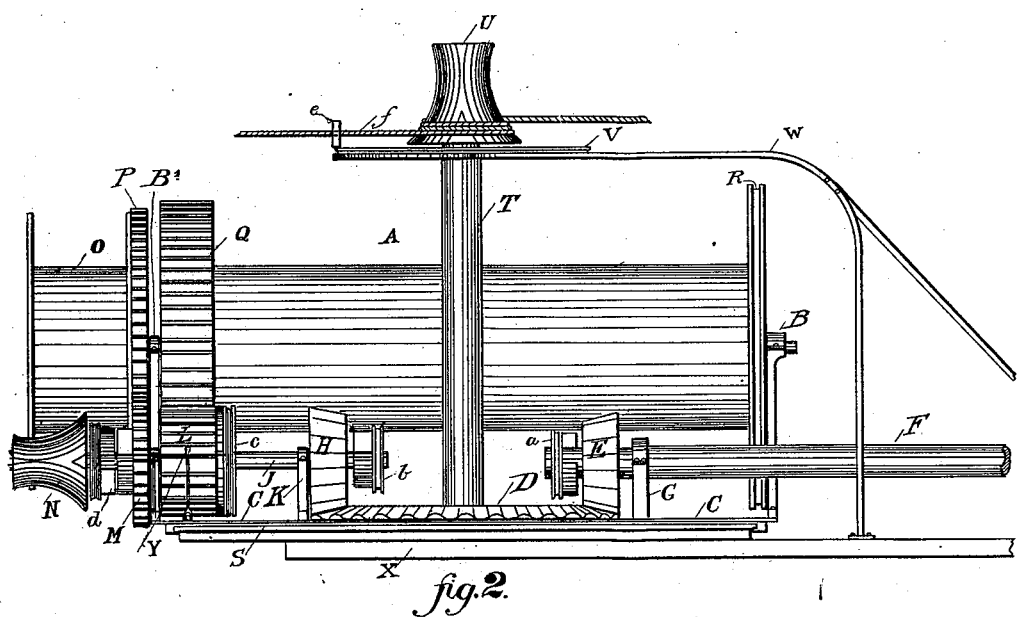

The accompanying drawings show ten figures, of which Figure 1 is a plan of the whole machine. Fig. 2 is a side elevation of the platform with winch and bed swung around at right angles to the platform. Fig. 3 is a plan view of portion of frame or platform and circular guideway, showing notches to engage tongues of stop device. Fig. 4 is a plan view of the main horizontal driving gear-wheel. Fig. 5 is a side elevation of main bearing for driving-shaft. Fig. 6 is a plan view of small gear-wheel to convey power from shaft to main gear-wheel and showing clutch-recess. Fig. 7 is a side elevation of the main driving-shaft, showing clutch attached thereto and vertical gear-wheel for operating the main gear-wheel. Fig. 8 is a side elevation of vertical shaft and capstan or gipsy carried by it. Fig. 9 is a plan view of bed, showing stop or locking devices and recess cut out to allow winch to turn at right angles. Fig. 10 is an end view of tongue of stop or lock to fit into notches in circular guide-wheel.

The winch-barrel A is journaled to uprights at B and B', rising from the bed C. A main horizontal driving gear-wheel D is keyed to a vertical shaft T. A smaller vertical gear-wheel E engages the main wheel D. This wheel E is mounted on the main driving-shaft F and can be disconnected by withdrawing the clutch $a$, which works on a feather. This driving-shaft F is held in position by the main bearing G. Another vertical gear-wheel H is mounted on an auxiliary driving shaft or spindle J, which is journaled to uprights K and B', rising from the bed C. This wheel H, controlled by clutch $b$, also engages the main wheel D, which conveys to it the power that turns the shaft or spindle J. Mounted on the spindle J are the vertical gear-wheels L and M, which clutches $c$ and $d$, working on feathers, connect and disconnect. The end of the spindle J carries a horizontal capstan or gipsy N. A drum O is placed above the gipsy N and turns on the same shaft as the winch-barrel. The inside end of the drum O has fitted to it a vertical gear-wheel P, which engages the gear-wheel M. A gear-wheel Q is attached to the end of the winch-barrel A next to the drum O, which wheel Q is made to engage the wheel L. The other and outer end of the winch-barrel A has an annular rim R, the edge of which is grooved to receive a band-brake.

Beneath the bed C is a circular guideway S. The lower end of the vertical shaft T is keyed to the center of the wheel D and works in a boss $h$, fitted to main frame X, and protrudes through the boss, so as to carry a driving-wheel. On the upper part of the shaft T are mounted an upright capstan or gipsy U and an outer railing V, shaped like or made of railway-iron rail. The shaft T, capstan U, and railing V are held in position by curved stays W, which are bolted or otherwise secured to the platform X, on which the bed C rests and turns. The stop-lever Y when applied keeps the machine at whatever angle to which it is turned by moving the tongues Z into notches on the upper surface of the guideway S.

The clutches $a$, $b$, $c$, and $d$ are provided for throwing the vertical wheels E, H, L, and M out of gear.

A slotted guide or block *e* is adjusted to the railing V to give direction to the rope or cable *f*.

The whole machine can be mounted on a sled, runners, or other form of carriage, so as to be easily moved from one position to another, which can be effected by the winch itself, or the whole machine can remain stationary.

By chocking the main wheel D and vertical wheel H the winch can be moved around on the guideway to almost any part of the circle.

Friction-rollers, one on the main bearer G and one sunk into the bed C, can be provided to support the main wheel D, and so give it ease in running.

A fly wheel or wheels can be mounted on the main driving-shaft F to carry belting or such like, so that when the vertical wheel E is thrown out of gear the power given by the shaft F can be utilized for other purposes.

Having fully described my invention, what I desire to claim and secure by Letters Patent is—

1. In a winch, a circular guideway, a winch-barrel mounted to move around said guideway in a horizontal plane, a locking device for holding the winch-barrel as adjusted, a horizontal gear-wheel, a driving-shaft for said horizontal gear-wheel, a vertical gear-wheel meshing with said horizontal gear-wheel, a gear carried by the winch-barrel and engaging the said vertical gear-wheel, a shaft extending vertically from the horizontal gear-wheel, and a capstan on the upper end of said shaft, substantially as specified.

2. In a winch, a supporting-frame, a winch-barrel supported by said frame, a circular guide on which the frame is adjustable on a horizontal plane, means for securing the said frame and winch as adjusted on said horizontal plane, a horizontal gear-wheel, means for rotating said gear-wheel, a vertical gear-wheel loosely mounted on a shaft and engaging with the horizontal gear-wheel, a gearing connection between the shaft of the said vertical gear and the winch-barrel, a capstan on the outer end of said shaft, and a drum mounted on the shaft with said vertical gear and operated from the said horizontal gear-wheel, substantially as specified.

3. In a device of the character described, a circular guide, a winch-barrel rotating on a horizontal axis, a platform or base upon which said winch-barrel is supported, clutch devices carried by said platform for engaging with recesses in the guide, a horizontal gear-wheel, a driving-shaft, a pinion loosely mounted on the driving-shaft and adapted for engagement with the gear-wheel, a clutch connection between said pinion and the shaft, and a gear connection between said gear-wheel and the winch-barrel, substantially as specified.

4. In a device of the character described, a circular guide, a platform mounted to rotate on said guide, means for securing the platform as adjusted on the guide, a vertical shaft, a capstan on the upper end of said shaft, a gear-wheel at the lower end of said shaft, a driving-shaft having a pinion connection with said gear-wheel, a spindle, a pinion loosely mounted on said spindle and adapted for engagement with the gear-wheel, means for locking said pinion in connection with the spindle, a gypsy on the outer end of said spindle, a gear connection between the spindle and the winch-cylinder, and a drum having gear connection with said spindle, substantially as specified.

5. In a device of the character described, a winch-barrel mounted to rotate on a horizontal axis and also to turn for adjustment about a vertical axis, clutch-controlled gearing for causing the movement of the winch-barrel, and means for securing the winch as adjusted, substantially as specified.

ROBERT ALEXANDER McLEOD.

Witnesses:
GEORGE WILLIAM BASLEY,
PERCY HERBERT BASLEY.